3,833,730
ANIMAL FEED CONTAINING 7-ISOPROPOXY-ISOFLAVONE

László Feuer, Mihály Nógrádi, Agnes Gottsegen, Borbála Vermes, János Streliszky, András Wolfner, Loránt Farkas, Sándor Antus, and Maria Kovács Tóth, Budapest, Hungary, assignors to Chinoin Gyogyszer-es Vegyeszeti Termekek Gyara Rt., Budapest, Hungary
No Drawing. Filed May 25, 1971, Ser. No. 146,773
Claims priority, application Hungary, May 27, 1970, CI-996
Int. Cl. A61k 27/00
U.S. Cl. 424—283          1 Claim

ABSTRACT OF THE DISCLOSURE

An animal feed containing 0.00002 to 0.1% of 7-isopropoxyisoflavone as a weight-gain promoting anabolic ingredient.

---

In order to reduce protein deficiency in nutrition, or to terminate it, thorough and significant reasearch is being carried out throughout the world. One of the most obvious ways to achieve this objective is the use of additives to nutrients and feed, which improve the utilization of the nutrients introduced into the organisms. In animal husbandry, these additives result in higher body-weight increase for an identical feed consumption and breeding period.

However, it has been rather difficult to develop an appropriate substance for increasing animal body weight since the use of substances with hormonal effects and of antibiotics is not permitted in most of the countries.

Isoflavone compounds have been subjected to a detailed investigation from the aspect of their body weight increasing effect. These compounds are rather widespread in plants, and a great number of them show oestrogenic properties (cf. Virtanen, A. J.: Angew. Chem. 70, 544, 1958; Virtanen, A. J., Hietala, P. K.: Acta Chem. Scand. 12, 579 1958). Grazing animals become infertile on consuming certain varieties of clover; research into this problem has shown that genistein and daidzein present in plants consumed by the pasturing animals are responsible for this effect because of their marked oestrogenic action (Chang, E. W. et al.: Ann. N.Y. Acad. Sci. 61, 625, 1955).

For the determination of the oestrogenic effect of isoflavones a reliable method has been evolved by East, J. (J. Endocrin. 13, 94, 1955). Since that time a number of authors have dealt very thoroughly with this problem (Matrone, G. et al.: Nutrition 69, 235 1956; Gábor, M.: Naturwiss. 46, 650 1959; Crabbé, P. et al.: J. Am. Chem. Soc. 85, 5258, 1958).

The present invention relates to an animal feed.

The 7-isopropoxyisoflavone or a salt thereof, is added to the feed in amounts from 0.00002 to 0.1%, prior to or after the admixture of further additives.

If desired, the compound is mixed with further additives. Substances with biological activity such as vitamins, aminoacids, choline chloride, salts of mineral acids, trace elements and other known substances of biological importance are suitable. The feed additive can be applied in premixes, in admixture with other components possessing biological effects. As further additives various diluents, solvents, sliding and molding substances, and carriers may be used. The feed additive can be mixed with the feed as a powder, granulate, powder mixture, emulsion or suspension. It is also possible to use the feed composition in mixtures added to the drinking water of the animals.

The active ingredients employed in the disclosed invention may be made by the processes disclosed in the examples set forth below.

On the basis of the abundant literature on studies concerning the oestrogenic properties of isoflavones, and of the data of our research in this field, we were able to produce an isoflavone compound as described which is devoid of any oestrogenic effects. According to the present invention, the 7-isopropoxyisoflavone shows a marked weight gain increasing effect which essentially exceeds that of isoflavone compounds possessing definitely oestrogenic effects, and this weight-increasing effect is associated with a reduction or complete absence of oestrogenic effects.

Thus, in the course of our observations in discovering in a field still not described in literature, i.e. in the group non-oestrogenic isoflavones, a very interesting novel biological effect, that of increasing the weight yield has been found. Beside this action, the compound possesses an anatoxic effect free of androgen effects as well (proved by N-retention and by the musculus levator test or by by measuring the skeletal muscle increasing effect). The compound is relatively easily and economically synthesizable on an industrial scale, and is stable, limitlessly storable and free of taste and odor.

Concerning the effect of the compound the pharmacological tests given below are of special interest.

Test of anabolic effect: The investigation was carried out with castrated rats by means of the musculus levator ani test and vesicula seminalis test. The preparations were administered orally for a period of three weeks. The tests were performed by the method of Eisenberg and Gordan (Eisenberg, E., Gordan, G. S. J.: J. Pharmacol. 99, 38 1950). In addition, also the weight of the prepared diaphragm of the animals was established. According to these tests, the weight of musculus levator ani rose by a Student significance of $p\ 0.01$, the weight of vesicula seminalis did not increase while the weight of the prepared diaphragm of the animals increased by a Student significance of $p\ 0.05$. On the basis of these results the preparations proved to be anabolic and free of androgen effect.

During the tests, a total of 30 mg./kg. of active ingredient was administered to the animals.

The investigation of nitrogen retention was carried out also with rats. Under a systematic treatment, the nitrogen excretion of the treated animals decreased on the 20th and 30th day, respectively, by a significance of $p\ 0.05$.

The result of these investigations similarly points to the anabolic effect.

Examinations with S-35 labelled methionine showed that with treatment, increased methionine incorporation takes place in the muscle tissues of the treated animals. The muscle-activity-increase was investigated by the forced swimming test of rats. The animals were forced to swim in water of 29 C. with a load of 3 g./100 g. body weight. The calorie content and quantity of feed administered was the same as with control animals.

The difference between the periods of forced swimming until exhaustion of the control animals and the animals treated for 45 days and forced to swim daily was 33 minutes (the control animals were subjected to identical treatment with the exception of the active ingredient), i.e. the swimming period (performance) of the control animals increased from 166 to 196 minutes while that of the treated animals from 162 to 225 minutes.

These experiments were carried out by administering daily doses of 5 mg./kg. of body weight.

In further experiments we succeeded in partially suppressing the anticatabolic effect of cortisone with the compound.

On examining the data of the analysis of body weight it was found that the weight increase of the muscle tissue was specifically greater than that of the fat tissue and that fat content of the muscle tissue decreased, while that of proteins rose.

The acute toxicity tests proved the full innocuity of the preparation. During a 48 hours period of observation no mice died on administering orally 4000 mg./kg. of body weight doses or subcutaneously 3500 mg./kg. doses. In rat tests, no perceptible alterations were observed during a 48 hour period, after administering orally or subcutaneously 3500 mg./kg. of body weight doses.

On dogs, no alterations were observed during a week of administering 3500 mg./kg. body weight doses.

The subacute toxicity tests were performed on rats. When administering daily doses of 200 mg./kg. of body weight and 500 mg./kg. of body weight orally, no alterations could be observed after one month of test period.

Similar results were obtained in the subacute tests carried out with mice.

As regards to chronic toxicity up to the present, the three-month chronic toxicity tests have been completed. After administering daily 100 mg./kg of body weight and 10 mg./kg. of body weight doses for three months to male and female rats, no perceptable alterations were observed (full blood investigation, histological and other clinical tests).

Similarly negative results were obtained in the toxicity test with dogs after the first 3 months of observation (here the applied doses were 20 mg./kg. of body weight and 50 mg./kg. of body weight).

The oestrogenic effect of the compounds was investigated by the uterus test on infantile mice, after oral and subcutaneous administration. No oestrogenic effects were observed.

After administering daily 5 mg./kg. of body weight of preparations to chickens for 30 days, the endocrine glands of the experimental animals were subjected to a detailed histological investigation. No perceivable alterations were observed.

The weight increasing effect induced by doses of 2 g./100 kg. of feed was in the various animal species as follows:

| | |
|---|---|
| 8 to 15% in calves | 8 to 20% in poultry |
| 7 to 10% in cattle | 10 to 20% in rabbits |
| 7 to 10% in hogs | 8 to 12% in guinea pigs |

The periods of administration varied from one to four months, depending on the animal species and conditions of breeding. The treated animals did not obtain greater amounts of feed than the control tests during the treatment period. Moreover, in several cases some saving of feed was attained in spite of the weight increasing effect.

It was observed during the treatment period that the experimentally treated animals showed an increased vitality, and that the weight increase was mainly due to an increase of the muscle mass. This was particularly evident in pig fattening trials when in case of bacon pigs the ratio of pigs of class A, poorer in fat was significantly higher.

In rats, also the effect exerted on the reproductive organs was separately examined. The capability of reproduction and the number of brood were in case of males and females pretreated with the active ingredient the same as that on untreated controls.

In an investigation on the uptake and excretion of C–14 labelled isoflavones it was found that the uptake is rather quick both in case of oral and of intramuscular administration. After oral administration, half of the ingredient introduced was excreted with urine while the other half with faeces.

In a number of organs, activity detectable by radiography was present 48 hours after completion of the treatment.

EXAMPLE 1

27 g. of 2-hydroxy - 4 - isopropyloxy-phenyl-benzyl ketone, 22 g. of ethyl orthoformate and 5 g. of morpholine are boiled for 8 hours in 200 ml. of dimethyl formamide. The ethanol formed during the reaction is removed through a fractionation head. Then the major part of solvent is distilled off in vacuum and the residue is diluted with dilute aqueous hydrochloric acid. The crude product is filtered and recrystallized from acetone, yielding 24 g. of 7-isopropyloxy-isoflavone of m.p. 115–117° C.

EXAMPLE 2

28.6 g. of 2-hydroxy-4-n-butyloxy-phenyl-benzyl ketone are dissolved in 50 ml. of anhydrous ether, 25 g. of zinc cyanide are added, and the solution is saturated, under cooling, with dry hydrogen chloride gas. After allowing the mixture to stand for 24 hours, the solvent is decanted from the separated oil, the oil triturated with ether, the ether is decanted, and the residue is heated with 1000 ml. of water for 30 minutes on a water bath. The product which precipitates on cooling is filtered, and recrystallized from a mixture of methanol and acetone, thus 15 g. of 7-n-butyloxy-isoflavone are obtained.

7-isopropyloxy-isoflavone already described in Examlpe 1 can be produced in a similar way.

EXAMPLE 3

A solution of 18 g. of 2-hydroxy-4-isopropyloxy-phenyl-benzyl ketone in 150 g. of ethyl formate is added in small portions under cooling to 9 g. of powdered sodium. After allowing the reaction mixture to stand for some hours, it is treated with ice water containing hydrochloric acid, the ethyl formate is distilled off, the residual aqueous mixture is boiled for an hour, and the product precipitated on cooling is recrystallized from acetone, thus 11 g. of 7-isopropyloxy-isoflavone are obtained, m.p. 115–117° C.

EXAMPLE 4

To a solution of 13.5 g. of 2-hydroxy-4-isopropyloxy-phenyl-benzyl ketone in 120 ml. of pyridine, 11 ml. of ethyl-oxalyl chloride are added under cooling. After allowing the reaction mixture to stand for a day, it is diluted with water, extracted with chloroform and repeatedly shaken with a 10% aqueous hydrochloric acid solution. On evaporating the solution, the residue is treated for 5 hours with a mixture of 100 ml. of methanol and 50 ml. of a 10% aqueous solution of sodium hydroxide, the methanol is distilled off, and the aqueous solution is acidified. The product is filtered, thoroughly dried and, after addition of 5 g. of powdered copper, heated to 250° C. On completion of the evolution of gas, the residue is crystallized from methanol, yielding 5 g. of 7-isopropyloxy-isoflavone, m.p. 116–117° C.

EXAMPLE 5

16 g. of phosphorus oxychloride are mixed with 50 ml. of dimethyl formamide with cooling. After 15 minutes, 27 g. of 2-hydroxy-4-isopropyloxy-phenyl-benzyl ketone are added, and the mixture is boiled for 18 hours under reflux condenser. On dilution with water, the precipitate is filtered, dried, boiled with 200 ml. of methanol, and the methanolic extract is evaporated to a small volume. On recrystallizing the separated crude product from acetone, 10 g. of 7-isopropyloxy-isoflavone described in Example 1 are obtained.

EXAMPLE 6

23.8 g. of 7-hydroxy-isoflavone in 200 ml. of anhydrous acetone are boiled, under stirring, with 18 g. of n-hexyl bromide, 18 g. of potassium carbonate and 1 g. of potassium iodide for 72 hours under reflux condenser. The inorganic salts are removed by filtration, the filtrate is subjected to steam distillation in order to remove acetone and excess reagent, the precipitate is filtered and recrystallized from acetone, yielding 20 g. of 7-n-hexyloxy-isoflavone, m.p. 120–122° C.

EXAMPLE 7

12 g. of 7-hydroxy-isoflavone are boiled for 2 hours under reflux condenser with 10 g. of potassium carbonate and 9 g. of sec-butyl bromide in 40 ml. of dimethyl formamide. On pouring the reaction mixture on water, the separated products is recrystallized from acetone, yielding 12 g. of 7-sec-butyloxy-isoflavone, m.p. 87–89° C. In a similar way, 7-isopropoxyisoflavone can be prepared.

EXAMPLE 8

Formulation of poultry raising feed:

| | Kg. |
|---|---|
| Maize | 40.0 |
| Feed wheat | 20.0 |
| Bran | 6.0 |
| Extracted soybeans | 13.0 |
| Extracted groundnut | 11.5 |
| Powdered alfalfa | 1.4 |
| Extracted sunflower seed | 4.0 |
| Potassium-phosphorus composite "Foszkál" | 0.5 |
| Feed lime | 2.3 |
| Feed sodium chloride | 0.3 |
| Vitamin premix 2 | 0.5 |
| Mineral premix II | 0.5 |
| Total | 100.0 |

+2 g. of 7-isopropyloxy-isoflavone/100 kg. of feed.

EXAMPLE 9

Formulation of pig feed:

| | Kg. |
|---|---|
| Bran | 22.0 |
| Extracted soybeans | 15.0 |
| Extracted groundnut | 6.0 |
| Powdered linseed | 14.0 |
| Powdered alfalfa | 4.0 |
| Powdered milk | 15.0 |
| Fish meal | 10.0 |
| Yeast | 2.0 |
| Feed lime | 6.0 |
| Feed sodium chloride | 1.5 |
| Vitamin premix | 3.0 |
| Mineral premix | 1.5 |
| Total | 100.0 |

+2 g. of 7-isopropyloxy-isoflavone/100 kg. of feed.

We claim:
1. An animal feed comprising a feed substance containing 0.00002 to 0.1% by weight of 7-isopropoxyisoflavone or a salt thereof.

References Cited
UNITED STATES PATENTS
3,352,754   11/1967   Gazave _____ 424—283

SAM ROSEN, Primary Examiner